United States Patent Office 3,208,703
Patented Sept. 28, 1965

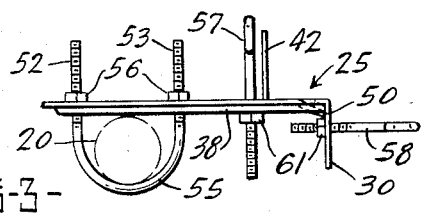
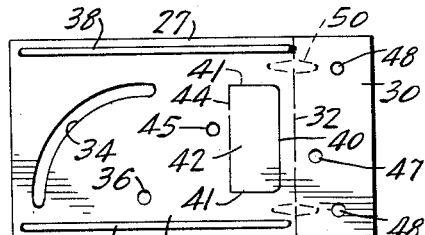
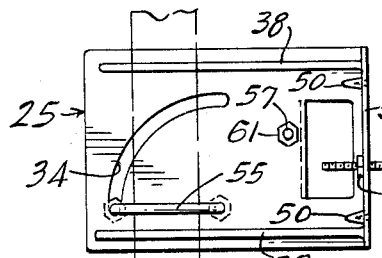
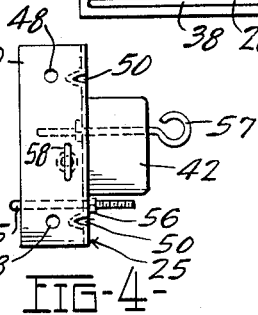
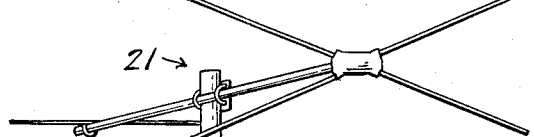
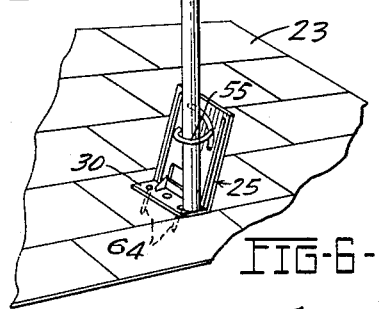
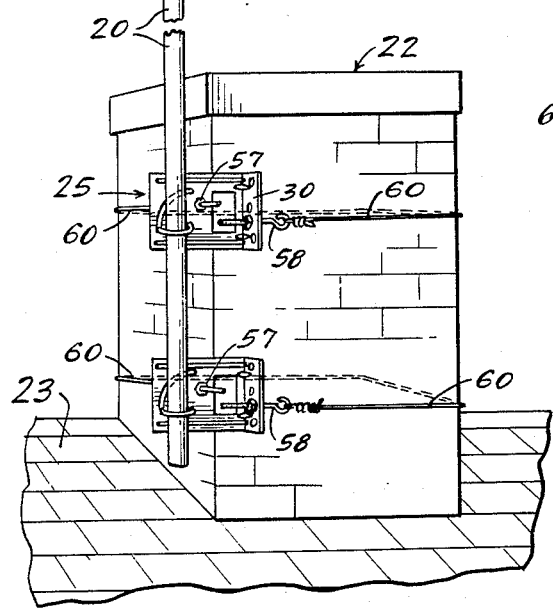
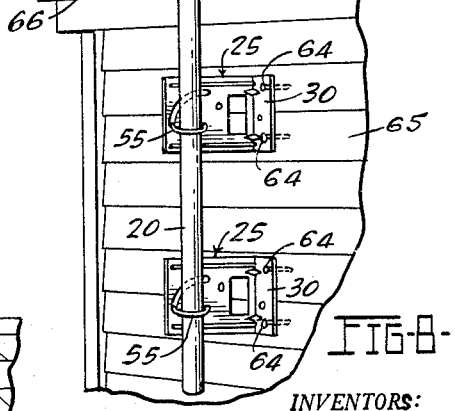
INVENTORS:
HARLEY E. ARNOLD,
BY GEORGE W. SAFFRAN.
ATT'Y.

3,208,703
THREE-WAY UNIVERSAL MAST MOUNT
Harley E. Arnold and George W. Saffran, Toledo, Ohio, assignors to S & A Electronics Inc., Oregon, Ohio, a corporation of Ohio
Filed Feb. 17, 1964, Ser. No. 345,190
13 Claims. (Cl. 248—43)

This invention relates to mounting brackets and is particularly directed to a three-way universal mounting means for television antenna masts.

An object of the present invention is to provide a mounting bracket that is efficient, can be used in a plurality of types of installations and is economically produced from light gauge sheet metal.

Another object of the invention is to provide a mounting bracket with mast clamping means which permits the mast to be initially rotatably and angularly positioned with respect to the bracket so that an antenna, for example, may be selectively directed and the mast disposed vertically regardless of the angularity of the support to which it is attached.

Another object of the invention is to provide bracket means by which a mast or pole may be mounted on flat or sloping roofs, corner members, side walls or chimneys of buildings or other desirable locations, it being contemplated that the brackets be used either singly or in pairs dependent upon the type of supporting structure.

Another object of the invention is to provide mast mounting means in kit form and with a minimum of parts sufficient however to permit installation on a roof, chimney or wall.

Generally speaking, the bracket of the invention comprises a sheet metal stamping having a right angled flange at one end and a second such flange spaced and extending in the opposite direction from the first flange, there being an arcuate slot adjacent the end of the stamping opposite the flange and a hole inwardly of the slot. A clamping means, such as the legs of a U-bolt are received in the slot and hole to clamp the mast and the bracket together at various degrees of angularity therebetween and to permit rotatable adjustment of the mast therein. Additional holes are provided in the first flange and in the plate adjacent the second flange to receive eye bolts or other fasteners for securing the bracket to a supporting structure.

The above mentioned and other features and objects of this invention and the manner of attaining them will become more apparent and the invention itself will be understood best by reference to the following description of an embodiment of the invention taken in conjunction with the accompanying drawing, wherein:

FIG. 1 is a fragmentary perspective view of a chimney mounting arrangement for a mast for a television antenna utilizing a pair of mounting brackets of the present invention;

FIG. 2 is a front elevational view of one of the brackets shown in FIG. 1;

FIG. 3 is a top plan view of the bracket shown in FIG. 2;

FIG. 4 is an end view of the bracket shown in FIGS. 2 and 3;

FIG. 5 is a plan view of a stamping from which the bracket shown in FIG. 2 is formed;

FIG. 6 is a fragmentary perspective view of a sloping roof on which a bracket of the invention is mounted for supporting a mast;

FIG. 7 is a fragmentary perspective view of a horizontal roof or platform on which a bracket of the invention is mounted for anchoring the lower end of a mast; and FIG. 8 is a fragmentary perspective view of a vertical wall of a building on which a pair of brackets of the invention are mounted for supporting a mast.

Referring to FIG. 1 of the drawings, a tubular antenna mast 20 has been shown as mounted on bracket means secured to a chimney 22 projecting from the roof 23 of a dwelling or other building. The mast 20 mounting an antenna 21 is secured to the chimney 22 by means of a pair of brackets 25 which incorporate the present invention. Each bracket 25 is identical and may be fabricated from a sheet metal stamping of comparatively light gauge, the perforated and embossed rectangular blank 27 for which is shown in FIG. 5. The blank 27 may be divided into a plate or body portion or member 28 and an end or flange portion 30 by a transverse dash line 32 which also serves as a bend line to form a generally L-shaped bracket as hereinafter described.

The body portion 28 of blank 27 is provided with an arcuate slot 34 adjacent one end thereof, the slot 34 covering an arc of 90°, at the center of which is provided a hole 36. Adjacent and parallel to each side edge of blank 27 may be a reinforcing rib 38 which may terminate short of the dash line 32. Intermediate the ribs 38 and adjacent the dash line 32 is a transverse slot 40 at the ends of which are somewhat shorter longitudinal slits 41 providing a flange panel 42 within the plane of the blank 27 but bendable outwardly therefrom along dash line 44. Adjacent dash line 44 may be a hole 45 for a fastening element, to be described later. Flange portion 30 may also be provided with holes 47 and 48, also for the reception of fastening elements to be described later. The thus prepared blank 27 is subsequently bent along lines 32 and 44 to provide oppositely projecting flanges 30 and 42, the flange 30 extending at a right angle from the end of the body portion 28, and the flange 42 also being at a right angle to the body member 28 and inwardly of flange 30 as shown in FIGS. 2, 3 and 4. Gussets 50 (see FIG. 2) may be provided at the juncture of flange 30 with the body 28 to strengthen and add rigidity to the flange 30 and the bend along line 32.

Slot 34 and hole 36 receive a pair of leg means 52 and 53, such as a U-shaped clamping means or U-bolt 55, capable of adjustment from a position longitudinally of bracket 25 as shown in FIGS. 1 and 8 to a position laterally thereof as shown in FIG. 7. The bight of U-bolt or parallel leg clamping means 55 is of a size to receive poles or masts of different diameters, for example from about ¾ to 1½ inches in diameter. The slot 34 permits the two leg clamping means or U-bolt 55, and thus the mast 20 clamped thereby, to be adjusted throughout a full 90° around the hole 36 as a center. The free ends of the parallel legs 52 and 53 of the clamping or U-bolt means 55, may be threaded to receive nuts or like means 56 to tighten the clamping means or bight of the U-bolt 55 and clamp the mast 20 against the member 28 of the bracket 25. Prior to drawing the nuts 56 tight, the mast 20 may be turned about its longitudinal axis to rotate the antenna 21, and/or be rocked into desired vertical attitude with respect to the bracket 25 and a supporting structure. Furthermore, it is to be understood that the U-shaped clamping means 55 may comprise a pair of parallel bolts bridged at one pair of adjacent ends thereof with a cross member or plate with a groove therein to engage the mast 20, instead of the bight of the U-bolt shown in the drawings.

For the installation shown in FIG. 1, a pair of brackets 25 may be used, each bracket being provided with eye bolts 57 and 58 adjusably received in holes 45 and 47, respectively, to extend from the bracket at right angles. The brackets 25 are secured in spaced relation at the corner of chimney 22 with their flanges 42 engaging one side wall thereof, and the adjacent face of the body member 28 between line 44 and line 32 engaging the adjacent chimney wall with the flanges 30 projecting outwardly from said adjacent chimney wall. Wire cables 60 pass around chimney 22 and have their ends secured in the eyes of bolts 57 and 58, nuts 61 on said bolts being used to tighten the cables securely. The mast 20 may then be secured to the brackets 25 by means of the clamping means or U-bolts 55 after being rotated to point the antenna 21 in the desired direction.

As shown in FIG. 6, mast 20 may be mounted directly on a slanting roof 23 by a single bracket 25. Although roof 23 is sloped, the bracket 25 can be mounted on a flat roof 63 as well, as shown in FIG. 7, and in either case the mast 20 is secured to the bracket 25 by clamping means or U-bolt 55. As in the FIG. 1 installation, the mast 20 may be rotated to selectively direct the antenna and may also be disposed vertically prior to being clamped securely to the bracket 25. In this instance, the bracket 25 is secured to the roof 23 or 24 by screws 64 passing through the holes 48 in flange 30.

In FIG. 8 a third mounting arrangement is shown. The mast 20 is secured to a pair of brackets 25 in a manner similar to the chimney mount of FIG. 1 except that the bracket flanges 30 are secured to the vertical wall 65 of a building by nails or screws 64 instead of to a chimney by cables 60. As in the FIG. 1 type of installation, the clamping means or U-bolts 55 may be tightened after the mast 20 is rotated. If the cornice or roof overhang 66 is excessive, the brackets 25 may be mounted on blocks or other means to position the mast 20 outwardly of the roof overhang.

From the foregoing it will be evident that three different types of antenna mounts are provided by the present invention with a minimum of parts. Bracket 25 replaces three other types of brackets usually required for the three different installations shown.

While there is described above the principles of this invention in connection with specific apparatus, it is to be clearly understood that this description is made only by way of example and not as a limitation to the scope of this invention.

What is claimed is:

1. A mast mounting means comprising: a bracket securable to a building structure, a mast member secured to said bracket, said bracket having a body portion and an end flange portion at a right angle to said body portion, and clamping means having a pair of parallel legs angularly adjustably mounted by said body portion for permitting axial rotation and then clamping said mast at a selected position on said bracket, and a second flange portion integral with said bracket and spaced from said end flange portion and extending in a direction opposite to said end flange portion, said body portion and said end flange being apertured to receive fastening means for securing said bracket to a surface of said building structure.

2. A mast mounting means according to claim 1 wherein said body portion has an arcuate slot and a hole at the center of the arc thereof through which said legs extend and in which arcuate slot the angle of said clamping means is adjustable.

3. A mast mounting means according to claim 1 wherein said clamping means comprises a U-bolt.

4. A mast mounting means according to claim 1 including fastening means in said aperture in said end flange.

5. A mast mounting means according to claim 1 and wherein said fastening means includes a plurality of eye-bolts and a cable therebetween for surrounding a building structure.

6. Mounting means for an antenna mast including a bracket, said bracket comprising a sheet metal plate having a first right angled flange at one end thereof, a second right angled flange spaced from said first flange and extending in the direction opposite to said first flange, said second flange being cut out of the plane of said plate, a plurality of apertures in said first flange for selectively receiving at least one fastening element for securing said bracket to a supporting structure, an arcuate slot adjacent the end of said plate opposite to said first flange, an aperture in said plate between said arcuate slot and said second flange, a U-bolt passing through said slot and said aperture in said plate, and means to adjust the bight of said U-bolt toward said plate to grip a mast therebetween, said U-bolt being arcuately adjustable within the limits of said slot to vary the angularity of said mast with respect to said bracket, and said bight adjusting means permitting axial rotation of said mast in said bracket.

7. Mounting means for an antenna mast according to claim 6 wherein a plurality of said brackets support said mast.

8. A bracket for supporting a mast from any surface from horizontal to vertical, comprising:
   (1) a plate member having
      (a) a right angled flange along one edge thereof,
      (b) a right angled ear projecting from the opposite side of said plate portion from said flange and being parallel to said flange and spaced inwardly from said edge,
      (c) an arcuate slot and a hole at the axis of the arc thereof, and
   (2) U-shaped clamping means having one of its legs extending through and arcuately movable in said slot, and the other of its legs pivoted in said hole,
   (3) means attached to the free ends of said extending legs projecting through said slot and said hole for permitting axial rotatable adjustment and clamping of a mast extending through said U-shaped clamping means to said plate member, and
   (4) apertures in said plate member and its said flange for fastening said bracket to a surface.

9. A bracket according to claim 8 wherein said right-angled ear is cut and bent from said plate member.

10. A bracket according to claim 8 wherein said arcuate slot extends for about 90° of arc.

11. A bracket according to claim 8 wherein said plate member includes a longitudinal reinforcing rib.

12. A bracket according to claim 8 including a reinforcing gusset between said plate member and said flange.

13. A bracket according to claim 8 including a pair of eye-bolts, one in an aperture in said plate member and the other in an aperture in said flange, and a cable connecting between the eyes of said two eye-bolts and extending around a building structure for holding said bracket to said structure.

References Cited by the Examiner

UNITED STATES PATENTS

| 1,303,249 | 5/19 | Brown | 248—289 |
| 2,482,575 | 9/49 | Cohn | 248—43 |
| 2,530,740 | 11/50 | Taylor | 248—43 |
| 2,575,254 | 11/51 | Blaugrund | 248—43 |
| 2,605,778 | 8/52 | Clapper | 135—46 |
| 2,667,317 | 1/54 | Trebules | 248—43 |

FOREIGN PATENTS

| 864,569 | 4/61 | Great Britain. |

CLAUDE A. LE ROY, *Primary Examiner.*